Oct. 29, 1935. H. J. L. FRANK ET AL 2,018,846
DUCT
Filed June 3, 1933 2 Sheets-Sheet 1
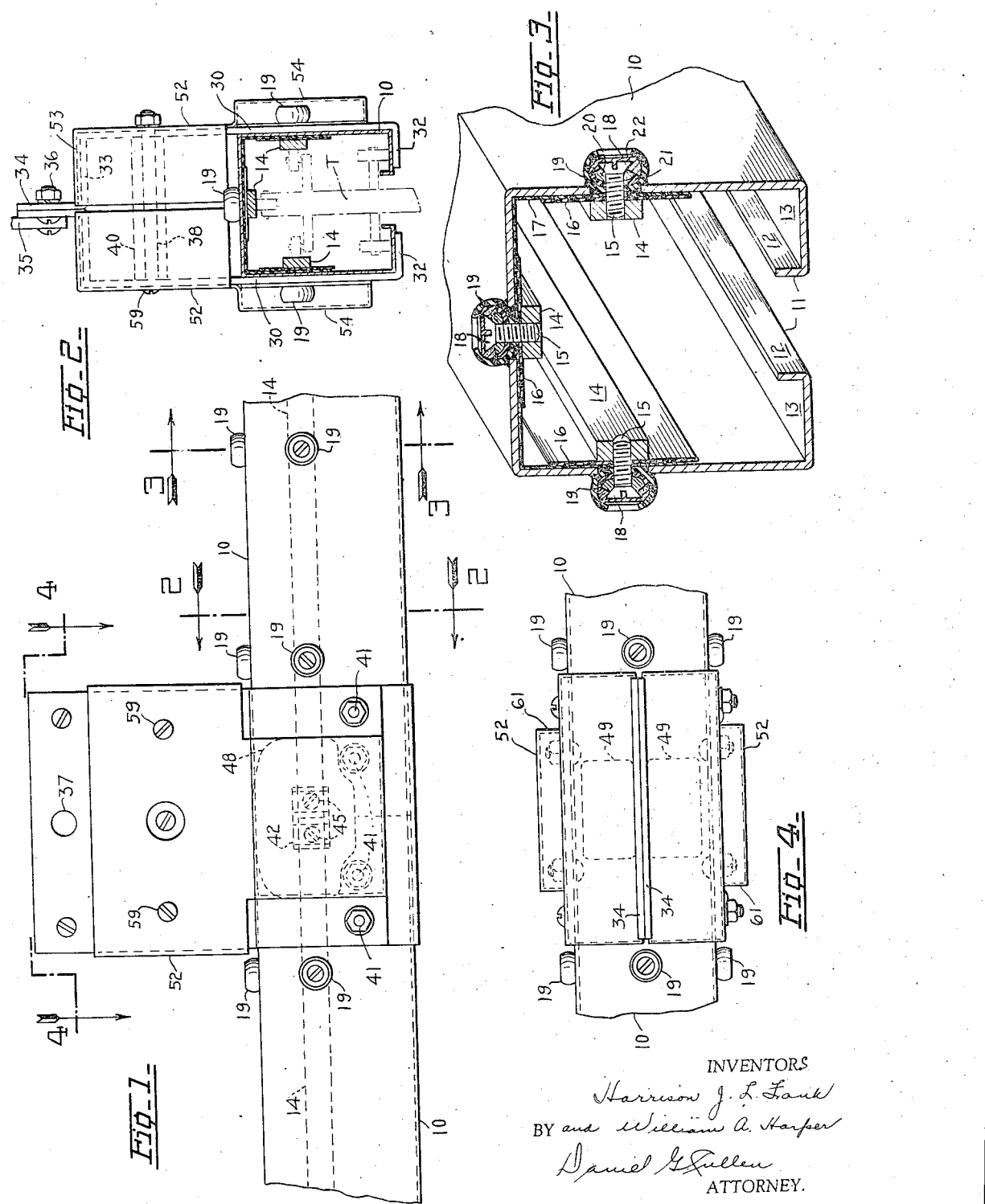
INVENTORS
Harrison J. L. Frank
BY and William A. Harper
Daniel G. Cullen
ATTORNEY.

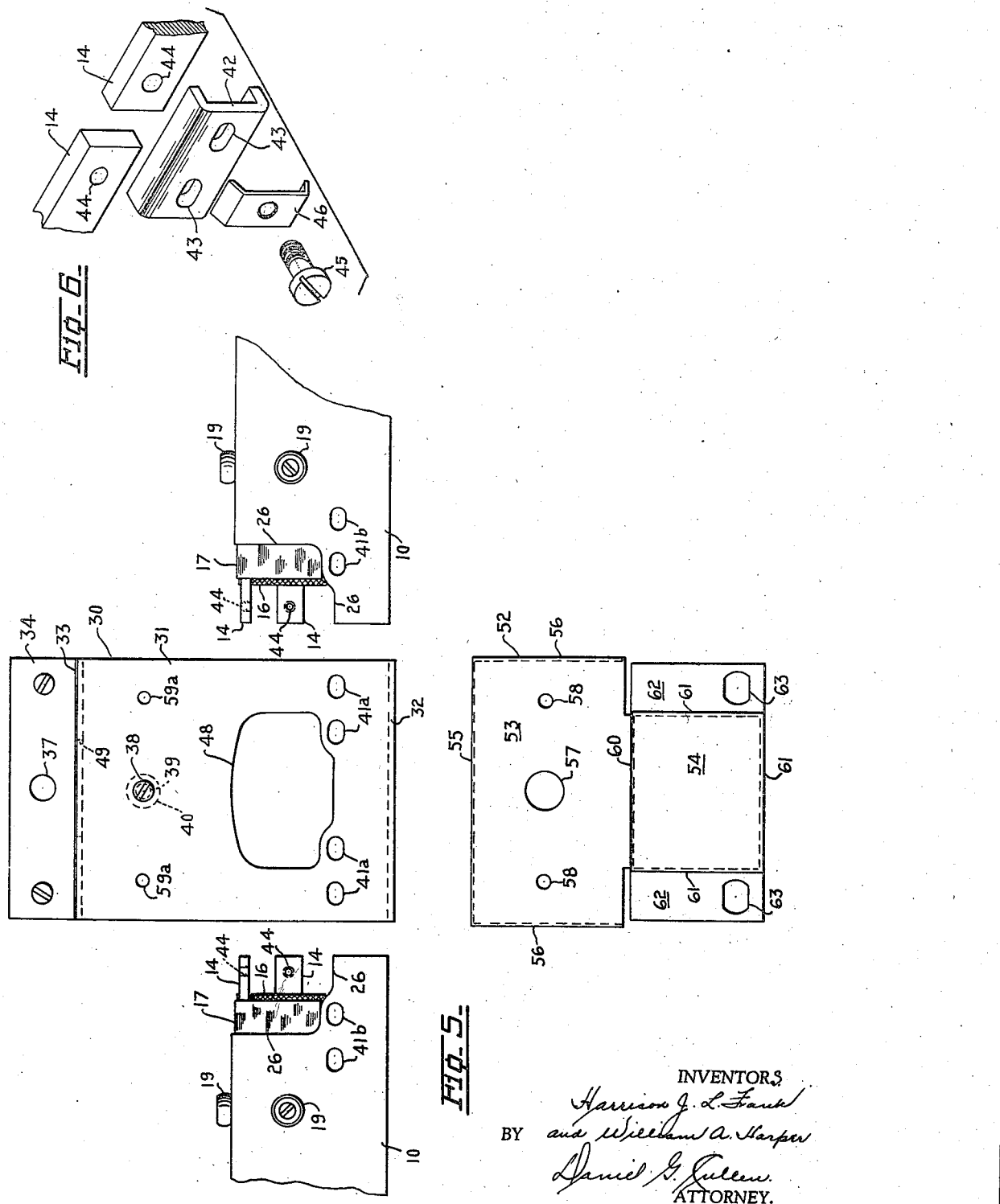

Patented Oct. 29, 1935

2,018,846

UNITED STATES PATENT OFFICE 2,018,846

DUCT

Harrison J. L. Frank and William A. Harper, Detroit, Mich., assignors to Bulldog Electric Products Company, Detroit, Mich., a corporation of West Virginia Application June 3, 1933, Serial No. 674,183

8 Claims. (Cl. 247—3)

This invention relates to current distribution systems and more particularly to means for distributing current from one part of a building to another, and it is to be understood that this case is to be considered along with copending application Serial No. 674,182, filed June 3, 1933.

This application relates to the duct or fixed structure which includes the casing and the enclosed bus bars from which current is to be taken, while the said application (No. 4,085) relates to the trolleys or collectors for withdrawing current from the duct disclosed in this application.

As has been described in the Frank et al Patents Nos. 1,819,885, and 1,819,886, of August 18, 1931, it has become current practice to provide a duct as the stationary part of a current distribution system, from which current may be taken by means of trolleys, collectors, or the like.

The present invention relates to an improved duct, it being understood that the term "duct" as used herein, is to include a sheet metal casing and the enclosed conductors or bus bars.

The principal object of the present invention is to provide a duct which shall be light weight and of small size, and, which has a high degree of economy of manufacture and installation.

A further object is the provision of a duct which can be made in standardized unit sections, each section including the casing and the enclosed conductors rigidly secured in place therein, the sections being assembled on the job, end to end, with a section casing end connected to a second section casing end, and with the ends of bus bars of one section connected to the ends of bus bars of a second section, at the places where the section casing ends are joined.

It will of course be understood that the joints between section ends are properly and effectively insulated, as deemed advisable.

It is contemplated to provide hangers for the duct and it is further contemplated to utilize hangers and associated parts as means for connecting section ends to each other. However, it is to be understood that section ends may be joined between hangers if desired, rather than at hangers, and that hangers may be supplied between section ends, as well as at section ends, all of this being within the purview of the instant application.

The invention also aims to provide novel details of section juncture means and novel details of hanger means.

The invention also aims to provide novel means for securing a part, for example, a bus bar, to a second part, for example, a sheet metal casing wall, the securing means being in the nature of a screw or the like, having a novel form of insulating button on and around the head thereof.

A further object is to provide a duct which will be sturdy and rigid, sufficiently to support the weight of a plurality of trolleys and their attached appurtenances, such as tools, etc., the duct presenting no obstacles in the way of friction surfaces, etc., to interfere with the free operation of the trolleys. Further, the duct is so constructed that the rails therein, upon which ride and are supported the trolleys, are separate and independent of the bus bars therein, along which move or ride the current collector parts of the trolleys, the bus bars not supporting the trolleys.

The invention further aims to provide a duct of the character specified which is so designed that reasonable manufacturing variations and tolerances, may be provided, to reduce the cost of manufacture, without impairing the operability or electrical characteristics of the device.

Still further objects of the invention will be presently understood upon reference to the detailed description of a preferred form of duct, the same being shown in the appended drawings.

In these drawings, Fig. 1 shows, in side elevation, two ends of duct sections, joined to each other, at, and provided with a hanger.

Figs. 2, 3, and 4 are sections as if on lines 2—2, 3—3 and 4—4 of Figure 1, different scales being chosen for these figures.

Fig. 5 is an exploded side elevational view of the two section ends, a hanger plate, and a hanger cover plate, taken from Fig. 1.

Fig. 6 is an exploded perspective view of the juncture between two ends of bus bar lengths, at a section juncture.

Referring to the drawings, it will be seen that the duct is assembled from a number of duct sections, of different contours and lengths, it being understood that the ends of adjacent sections are joined to form a continuous duct.

The sections include sheet metal casings 10 of substantially rectangular cross section and having their lower, or bottom, walls provided with openings 11 which provide external access to the trolley or collector used in conjunction with the duct.

The edges of the bottom wall openings 11 are turned upwardly, as at 12, to form vertical flanges bounding the opening 11, and rigidifying the parts 13 of the bottom wall, which parts form rails for the riding wheels of the trolley or collector.

In the multiphase form of Fig. 3, where three bus bars 14 are provided, the three bus bars will preferably, though not necessarily, be positioned on the three walls of the casing other than the bottom wall, and will be held in place against these walls of the casing by means of screw bolts 15, which pass through holes in the walls and which are threaded into tapped holes of the bus bars, it being understood that the bus bars and the sheet metal casing are initially provided with these holes, for the reception of these screws, at suitable and uniformly spaced intervals. The bus bars are insulated from the sheet metal casing walls by insulating strips 16, of which there is one for each bus bar, and by means of a channel-shaped sheet of insulation 17, of which there is one for each duct section.

The heads 18 of the screws 15 are slotted for the reception of a screw-driver and are disposed within fibre cups 19 which surround and insulate the heads 18 of the screws. Within the fibre cups 19 are steel washers 20 and fibre washers 21, and the bottoms of the cups 19, and the washers 21, insulate the heads from the grounded sheet metal casing 10. The fibre cups are formed from fiber tubing, swedged over the heads of the screws, to the barrel shape shown.

After the bus bars of any one section have been secured to the sheet metal casing of that section by means of the screws 15 and before the section is shipped from the factory, where it is fabricated, to the place where it is to be assembled with other and similar sections to form a duct, the open ends of the fibre cups 19 are inturned and closed, by being swedged, and are then filled with an insulating material 22, which may be of the nature of sealing wax, capable of being poured into the cups 19 in a molten state and solidifying to embed the heads 18 therein, the whole construction forming effective insulating closures, seals, and rotation-preventing means for the heads 18 of the screws 15.

Each section has two ends and these ends are duplicate in all respects. An end construction will now be described with particular reference to Fig. 5.

As shown in this figure, each end of the sheet metal casing 10 is cut away on the top wall, and on the two side walls, to a point about two-thirds down from the top of the casing, the line of cut for this cutaway being referenced 26. The insulating channel 17 projects beyond the major part of the cut line 26, as indicated, but does not project beyond the end of the casing section 10. Similarly, the insulating strips 16 are permitted to project slightly beyond insulation 17 but do not project beyond the end of the casing section 10. The bus bars 14 project beyond the insulation 16 and 17 and terminate at the end of the casing section 10, all substantially as indicated in Fig. 5.

Section ends are joined to each other by and at a hanger construction, as shown. Each hanger includes two bent hanger plates 30 which embrace the section ends so as to enclose and support the same. These hanger plates have vertical plate parts 31 whose lower edges are laterally bent to form supporting flanges 32 and whose upper edges are laterally and then vertically bent, as at 33—34, the last mentioned portions being secured to a fixed structure part 35 by a means 36, such as a bolt, passed through the aligned holes 37, of the hanger plates, as shown in Fig. 2. An additional tie between the hanger plates 30 is provided by a bolt 38 passed through holes 39 of the hanger plates and surrounded by a spacer bushing 40 of fibre, or the like.

When an assembly between the end of a previously mounted section and the end of one that is to be mounted is to be effected, a socket is formed on the end of the mounted section by the hanger plates 30 that are secured to that end of the previously mounted section by means of screws 41 passing through one pair of the slots 41a of the hanger plates and the aligning pair of slots 41b of the previously mounted section end, which screws, it is observed, are considerably below the bus bars 14, and which screws do not project into the duct passage. Into the socket thus formed is thrust and is similarly fastened the end of the section that is to be mounted.

After this is done, the adjacent bus bar ends are secured to one another by means of the bus bar connections of Fig. 6. The two adjacent ends of the bus bars are received within a channeled copper connector 42 whose slots 43 align with tapped holes 44 of the bus bars, and screws 45 pass through the slots 43 into holes 44, the heads of the screws bearing against washer plates 46. It will be observed that the connections between the bus bar ends are such that no humps or gaps at the ends are produced, on the inside surfaces of the bus bars, to interfere with smooth rolling of collector wheels along the run. The connectors 42, as will be seen, dispose themselves on the outside surfaces of the bus bars, in cutouts or openings 48—49 of the hanger plates. These cutouts also permit the manipulations necessary to secure and connect the bus bar ends.

To cover these cutouts or holes, hanger cover plates are provided. These cover plates, of which there are two, one for each hanger plate 30, are referenced 52 and include upper portions 53 and lower portions 54. The upper portions 53 are in the nature of vertical plates provided with horizontal flanges 55 and vertical flanges 56 at right angles thereto and to the vertical plates 53, and are also provided with large holes 57 for clearing the head or nut of the bolts 38, and with holes 58 for receiving screw bolts 59 which pass through the plates 53 and holes 59a in the portions 31 of the hanger plates, these screws assisting in securing the cover plates and the hanger plates 30 to each other.

The lower portions of the cover plates include vertical plates 54 connected to the vertical plates 53 by horizontal portions 60 and provided with flanged edges 61, the vertical edges 61 being flanged again as at 62. The cover plate parts 54 align with the holes 48 in the adjacent hanger plates and cover them, the parts 54 however, being spaced from the hanger plates 30 by the flanged edges 60—61 of the cover plate to provide air chambers around the live ends of the bus bars. Large slots 63 in the flanges 62 of the cover plates align with the outer ones of the holes 41a in the hanger plates and the outer ones of the holes 41b, of the casing 10, to clear the bolts 41 passing through the hanger plates and casings.

It is observed that the various connections between parts are effected through the medium of slots, such as those referenced 41a, 41b, 43, etc., which permit facile assembly of the parts, despite manufacturing variations which occur in the manufacture of the parts, without interfering in any way with the creation of closed joints at all points and for all parts.

Further, it is noted that the cover plates 52 completely and effectively enclose the joints and the parts thereof, preventing mechanical injury to these parts, and insuring against accidental contact with the parts.

It will further be observed that the exposed ends of the top, or horizontal, bus bars 14 are protected by a casing formed in part by the flanges 56 of the cover plates, the lower edges of the flanges 56 resting on and engaging the top surfaces of the casings 10.

It is observed that, by positioning the bus bars as shown, one on the duct top, and two on the sides, compactness is effected without sacrificing the necessary clearance between the bus bars.

It is further observed the bus bars, which are secured in place by the screws 15, themselves secure the insulation sheets in place in the duct, and that this feature effects economy of manufacture, as well as providing satisfactory smooth riding surfaces inside the duct.

It is observed that the ducts provide self contained current distributing runs and also self contained trolley rails. They may be used to provide nothing more than a trolley rail system, no current being drawn from the bus bars; they may be used to provide a current distributing system alone, no riding trolley being provided, or they may be used to provide a trolley rail and a current distributing system, and that trolley rails may be inserted into the duct, for trolley use, without there being any danger that trolley parts will come in contact with the bus bars.

We claim:

1. A trolley duct system comprising trolley duct sections joined end to end and having rail sections joined to form smooth continuous rail runs and having bus bar sections separate and independent of the rail sections, walls of the duct sections having openings registering with and providing access to adjacent ends of the bus bar sections so that such ends may be joined from outside the duct to form smooth continuous bus runs, and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts.

2. A trolley duct system comprising trolley duct sections joined end to end and having rail sections joined to form smooth continuous rail runs and having bus bar sections separate and independent of the rail sections, walls of the duct sections having openings adjacent duct section junctures registering with and providing access to adjacent ends of the bus bar sections so that such ends may be joined from outside the duct to form smooth continuous bus runs, and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts, and means for closing said openings and for joining and rigidly intersecuring and supporting and aligning adjacent duct section ends.

3. A trolley duct system comprising trolley duct sections joined end to end and having rail sections joined to form smooth continuous rail runs and having bus bar sections separate and independent of the rail sections, walls of the duct sections having openings registering with and providing access to adjacent ends of the bus bar sections so that such ends may be joined from outside the duct to form smooth continuous bus runs, and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts, and means for reinforcing and supporting the rail sections of the duct adjacent said openings.

4. A trolley duct system comprising trolley duct sections joined end to end and having rail sections joined to form smooth continuous rail runs and having bus bar sections separate and independent of the rail sections, walls of the duct sections having openings adjacent duct section junctures registering with and providing access to adjacent ends of the bus bar sections so that such ends may be joined from outside the duct to form smooth continuous bus runs, and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts, and means for closing said openings and for joining and rigidly intersecuring and supporting and aligning adjacent duct section ends, and for reinforcing and supporting the rail sections of the duct adjacent the openings.

5. A trolley duct system comprising trolley duct sections joined end to end and having rail sections joined to form smooth continuous rail runs and having bus bar sections separate and independent of the rail sections, walls of the duct sections having openings adjacent duct section junctures registering with and providing access to adjacent ends of the bus bar sections so that such ends may be joined from outside the duct to form smooth continuous bus runs, and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts, and means for closing said openings and for joining and rigidly intersecuring and supporting and aligning adjacent duct section ends, the last mentioned means being provided with openings registering with the duct openings and closed by supplemental movable closures, whereby bus bar joining may be effected through the openings of the means and the duct after duct sections are joined.

6. A trolley duct system comprising trolley duct sections joined end to end and having rail sections joined to form smooth continuous rail runs and having bus bar sections separate and independent of the rail sections, walls of the duct sections having openings adjacent duct sections junctures registering with and providing access to adjacent ends of the bus bar sections so that such ends may be joined from outside the duct to form smooth continuous bus runs, and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts, and means comprising complemental portions detachably interconnected for closing said openings and for joining and rigidly intersecuring and supporting and aligning adjacent duct section ends, and for reinforcing and supporting the rail sections of the duct adjacent the openings, the last mentioned means being adapted to be disassembled to permit one bus duct section to be dropped from a run without disturbing the others.

7. A trolley duct system comprising trolley duct sections joined end to end and having rail sections joined to form smooth continuous rail runs and having bus bar sections separate and independent of the rail sections, walls of the duct sections having openings remote from the rail sections registering with and providing access to adjacent ends of the bus bar sections so that such ends may be joined from outside the duct to form smooth continuous bus runs and electrically conducting bus bar coupling means separate from the bus bars and registered with and accessible for manipulation through such openings for joining such ends through the coupling means in a manner to prevent separation of such ends and to avoid interruption of the smooth continuity of those surfaces of the bus bars to be engaged by collector contacts.

8. A trolley duct system comprising trolley duct sections joined end to end and having rail sections joined to form smooth continuous rail runs and having bus bar sections separate and independent of the rail sections, walls of the duct sections having openings registering with and providing access to adjacent ends of the bus bar sections so that such ends may be joined from outside the duct to form smooth continuous bus runs, and electrically conducting bus bar coupling means separate from the bus bars and registered with and accessible through such openings for joining such ends through the coupling means in a manner to prevent separation of such ends and to avoid interruption of the smooth continuity of those surfaces of the bus bars to be engaged by collector contacts, and movable closures for said openings.

HARRISON J. L. FRANK.
WILLIAM A. HARPER.